July 19, 1966 G. M. DE GRYSE ET AL 3,261,577
INSTRUMENT MOUNTING DEVICE
Filed Aug. 14, 1964
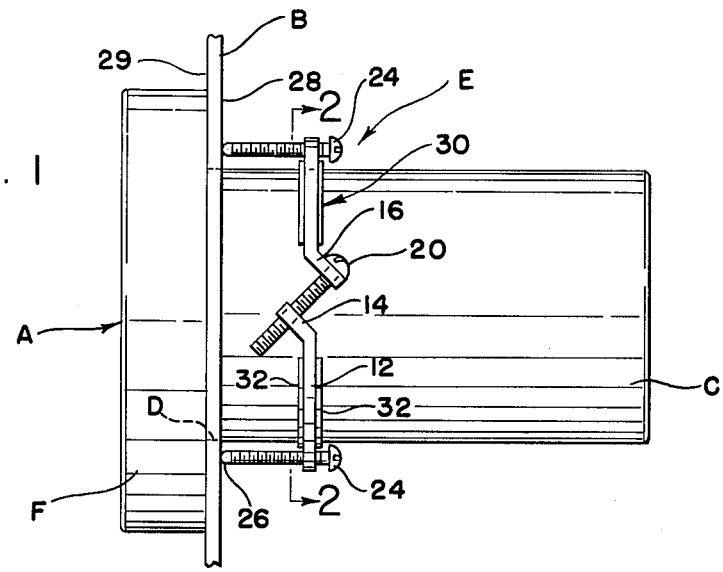
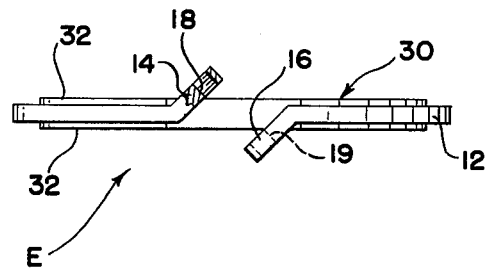
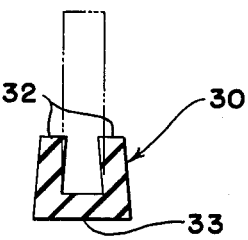
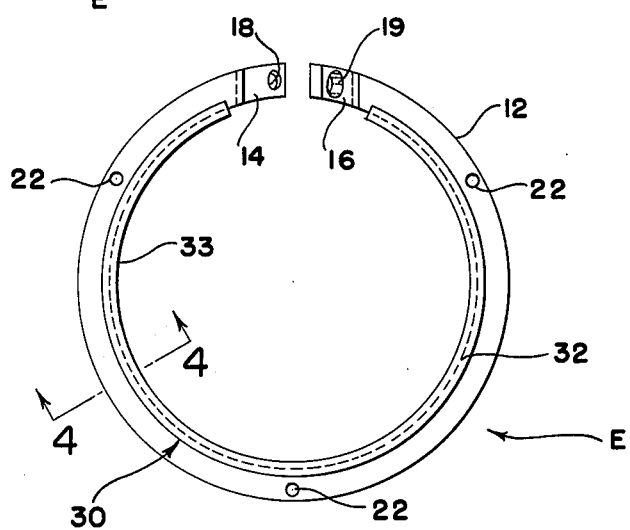
INVENTORS.
GENTIEL M. DE GRYSE &
ROBERT H. HORNBACK
BY
Tilbery & Body
ATTORNEYS

United States Patent Office 3,261,577
Patented July 19, 1966

3,261,577
INSTRUMENT MOUNTING DEVICE
Gentiel M. De Gryse, East Moline, and Robert H. Hornback, Rock Island, Ill., assignors to E. W. Bliss Company, Canton, Ohio, a corporation of Delaware
Filed Aug. 14, 1964, Ser. No. 389,678
5 Claims. (Cl. 248—27)

This invention relates to the art of instrument mounting devices and more particularly to an improved radially and axially adjustable clamp for holding an instrument in an instrument panel.

Prior known clamps of this type commonly include a split metal ring which is slipped over that portion of the instrument housing protruding from the rear of the instrument panel. The circumferentially spaced ends of the ring are adapted to receive a screw for clamping it to the instrument housing. A plurality of mounting screws in the ring are adjustable to abut against the rear surface of the instrument panel thus drawing a face flange of the instrument tightly against the front of the panel.

One of the problems with such prior devices has been a tendency to damage or strain the instrument housing and/or instrument panel during installation. Heretofore, when the instrument was pulled axially into abutment with the instrument panel by the mounting screws there was no override feature of the clamp which would tell the workman that an excess of stress and strain was developing in either the instrument housing or panel. It has been found that such forces are detrimental and affect the reliability of sensitive instruments; such as timers, volt meters, ammeters, electric counters or the like.

Another problem with known instrument clamps is their inaccessibility. That is, where a plurality of instruments are grouped in side-by-side relationship in an instrument panel, it is often difficult to get between the instrument housings in order to tighten or loosen the clamp of one and as a result it often happens that several instruments must be removed in order to replace one that is defective.

The present invention contemplates a new and improved instrument mounting clamp which will be inexpensive to manufacture, have fewer parts and will overcome all of the aforementioned difficulties and others which were common with the prior art devices.

In accordance with the present invention an instrument mounting installation is provided which includes an instrument having a cylindrical housing and a radially extending abutment thereon, an instrument panel having an aperture through which a substantial portion of the housing projects, an annular member encircling the instrument housing on the side of the panel opposite from the housing abutment and having circumferentially spaced ends extending in opposite directions and parallel to a plane inclined to the instrument housing axis, an adjustable fastener member extending between the ends and being operable in such plane for applying a clamping force to the housing, and axially adjustable elements on the annular member engageable with the rear of the panel and operable to draw the housing abutment into engagement with the panel.

Further, in accordance with the invention, the radial member includes a flexible liner extending circumferentially between the inner periphery thereof and the instrument housing to provide uniform clamping pressure on the housing.

As also provided by the invention, the flexible liner has a generally U-shaped cross section in freely fitting relationship with the annular member such that it is slipped out of its seat when a predetermined amount of axial force applied to the instrument panel is exceeded so as to release the clamping force on the instrument panel to avoid possible damage to the instrument.

These and other objects will be more fully appreciated by reference to the following description of the drawings wherein:

FIG. 1 is a side, elevational view showing an instrument installed in an instrument panel using the inventive instrument mounting device;

FIGURE 2 is a front, elevational view of the clamping ring and liner of the inventive mounting device taken along line 2—2 of FIGURE 1;

FIGURE 3 is a plan view of the clamping ring and liner shown in FIGURE 2; and,

FIGURE 4 is a cross-sectional view of the flexible liner taken along line 4—4 of FIGURE 2.

Referring generally to the drawings wherein the showings are for the purpose of illustration a preferred embodiment of the invention only and not for the purpose of limiting same, FIGURE 1 shows an instrument A mounted in a panel B having a housing C which projects axially behind the panel B through an aperture D therein. A preferred embodiment E of the novel mounting device surrounds the housing C and is adapted to clamp the instrument A in the panel B.

In more detail, the preferred embodiment of the mounting device E includes an annular member 12 shown disassembled in FIGURES 2 and 3. The annular member 12 is split at one point in its circumference and in accordance with the invention the adjacent ends 14, 16 are bent in opposite directions parallel to a plane inclined with respect to the axis of the annular member 12 at an angle of approximately 45°. While the angle of bend is preferably about 45°, it should be understood that a slightly lesser or larger angle may be tolerated without affecting the operation of the clamp as will be made clear hereinafter. The ends 14, 16 have aligned threaded openings 18, 19 which receive a ring clamping screw 20. A plurality of threaded openings 22 spaced equally around the ring 12 are adapted to receive mounting screws 24 having rounded bottoms 26 which abut against the rear surface 28 of the panel B. The instrument housing C includes a radially extending portion F larger than the aperture D which abuts the front face 29 of the panel B when the instrument A is installed.

Referring to FIGURES 2 and 4, it is noted that the annular member 12 has a resilient liner 30 extending circumferentially around the inner periphery thereof from adjacent end 14 to adjacent the opposite end 16. In accordance with the invention, the liner 30 has a generally U-shaped cross section, as shown in FIGURE 4, and is adapted to fit freely over the inner periphery of the annular member 12 such that the leg portions 32 extend partially up the sides of the member 12 and the back portion 33 seats against the inner periphery of member 12. The liner 30 is preferably made of a relatively hard rubber of around 65-75 durometer for reasons which will be explained.

Referring again to FIGURE 1, when the instrument A is to be installed, it is inserted through the aperture D of the panel B such that the housing C extends rearwardly and the radially extending portion F thereof is in light engagement with the front surface 29 of the panel B. The ring clamping screw 20 is assembled and adjusted in the ends 14, 16 so that the annular member 12 and liner 30 have a diameter slightly larger than the diameter of the housing C in order that it may be slipped over the housing. The mounting screws 24 are adjusted to approximately equal axial distances and abut against the rear surface 28 of the panel B. By tightening the ring clamping screw 20, the ends 14, 16 of the annular member 12 are drawn circumferentially toward each other, thus placing a clamping force on the housing C. When the annular member 12 and liner 30 are securely in place, the mounting screws 24 are screwed against the rear surface 28 of the panel B to draw the radial portion F of the instrument A firmly against the front surface 29 of the panel B.

As pointed out, one deficiency of prior art instrument clamping rings has been the inaccessibility of the clamping screw. That is, with prior art devices where the ring ends extend parallel to the ring axis, the clamping screw extends normal to the plane of the ends. Thus, when instruments are closely grouped in a panel, the working space between the protruding housings is not usually great enough to permit loosening of a clamp in the event one instrument needs to be replaced. However, with the invention, the clamping screw 20 extends at an angle allowing the head to be easily reached from the rear of the instrument housing. For this reason, the angle at which the ends 14, 16 is bent should be great enough to dispose the clamping screw 20 at sufficient rearward inclination while at the same time being small enough to develop a strong radial clamping force on the member 12. In the preferred embodiment, the angle of inclination of the ends 14, 16 is approximately 45°, but it will be clear that a slightly lesser or greater angle could be tolerated and still achieve the desirable results contemplated by the invention.

A further shortcoming of the prior art devices has been the inability of the operator to properly adjust the mounting screws which abut against the rear face of the panel thus often placing excessive strain on the instrument panel and housing by drawing them together too tightly.

With the present invention this difficulty is overcome by the use of a flexible liner 30 on the inner periphery of the annular member 12. To illustrate its operation, with the clamping screw 20 tightened down so that the annular member 12 and liner 30 firmly gripping the housing C, the workman begins adjusting the axial length of the mounting screws 24 so as to bring the radial flange F of the instrument in firm engagement with the front surface 29 of the panel B. By continuing to tighten the screws 24, more and more strain is placed on the panel and housing of the instrument. Since there was heretofore no convenient way to detect the degree of strain in prior art devices, it often occurred that these stresses impaired the reliability of sensitive instruments. In the present invention, however, when a predetermined amount of stress has developed in the housing C, the flexible liner 30 will slip out of its seat under the annular member 12 thus releasing the clamping force established by the clamping screw 20. For this reason the ring is preferably made of a relatively hard rubber which will hold a clamped position but is flexible enough to roll out from under the member 12 if excessive force is applied. Thus, the workman avoids damaging the instrument or panel and upon resetting the mounting screws 24, if necessary, can reinstall the novel clamping device E in the proper manner.

While the invention has been described with reference to a preferred embodiment, obviously modifications and alterations will occur to others upon reading and understanding of this specification and it is the intention to include such modifications insofar as they come within the scope of the appended claims except where limited by the prior art.

Having thus described our invention, we claim:

1. In an instrument mounting installation including an instrument having a cylindrical housing with a radially extending abutment and an instrument panel having an aperture through which a substantial portion of the housing projects, the improvement comprising:

an annular member having circumferentially spaced ends encircling the housing on the side of the panel opposite from said abutment, adjustable fastener means extending between said ends being operable in a plane inclined to the axis of said instrument for urging said ends circumferentially together, axially adjustable means on said annular member being engageable with said panel for drawing said abutment firmly against said panel when in the installed position, and a flexible liner extending circumferentially between the annular member and housing *for releasing* the annular member when a predetermined amount of axial force is applied.

2. The improvement as set forth in claim 1 wherein said flexible liner releases the annular member when a predetermined amount of axial force is applied by slipping out of its position under the annular member to release the clamping force being applied.

3. The improvement as set forth in claim 2 wherein said flexible liner has a generally U-shaped cross section engaging the inner periphery of said annular member and in frictional engagement with said housing, said liner being axially yieldable when a predetermined amount of axial force applied to the annular member by said axially adjustable means is exceeded thereby releasing said force and avoiding possible damage to the instrument.

4. An instrument mounting device for use in the installation of an instrument having a cylindrical housing with a radially extending abutment thereon and adapted to be inserted in an aperture of an instrument panel such that a substantial portion of the housing projects beyond the plane thereof comprising:

an annular member encircling the housing on the side of the panel opposite from said abutment, having circumferentially spaced ends extending in opposite directions and parallel to a plane inclined to the instrument axis, fastener means accessible from the rear of the instrument extending between said ends and normal to said plane for adjusting the circumferential spacing of the ends and to apply clamping force on said housing, axially adjustable means on said annular member being engageable with the rear of said panel and operable for shifting said radial abutment firmly against the panel when in the installed position, and an elastomeric liner extending circumferentially between the annular member and housing having a generally U-shaped cross-section, the bottom surface of which provides an anti-slip bearing surface for frictional engagement with said housing and the leg portions of which are yieldable when a predetermined amount of axial force is applied so as to permit the liner to roll out from under the annular member releasing the clamping force and avoiding possible damage to the instrument.

5. An instrument mounting device as set forth in claim 4 wherein said elastomeric liner is formed of a material having a hardness in excess of 65 durometer.

References Cited by the Examiner

UNITED STATES PATENTS

| 2,458,670 | 1/1949 | Young | 248—56 |
| 2,752,217 | 6/1956 | Simon | 312—242 |
| 3,056,571 | 10/1962 | Schofield et al. | 248—75 |
| 3,061,903 | 11/1962 | Jagiel | 24—268 |

FOREIGN PATENTS 494,017  10/1938  Great Britain.

CLAUDE A. LE ROY, *Primary Examiner.*

FRANK L. ABBOTT, CHANCELLOR E. HARRIS, *Examiners.*

R. P. SEITTER, *Assistant Examiner.*